US012783521B2

(12) United States Patent
Ghatage

(10) Patent No.: US 12,783,521 B2
(45) Date of Patent: Nov. 3, 2026

(54) INTEGRATED DATABASE MACHINE LEARNING OPERATIONS

(71) Applicant: Salesforce, Inc., San Francisco, CA (US)

(72) Inventor: Anup Ghatage, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 19/041,207

(22) Filed: Jan. 30, 2025

(65) Prior Publication Data

US 2025/0355877 A1 Nov. 20, 2025

Related U.S. Application Data

(60) Provisional application No. 63/649,896, filed on May 20, 2024.

(51) Int. Cl.
*G06F 16/00* (2019.01)
*G06F 16/242* (2019.01)
(Continued)

(52) U.S. Cl.
CPC ...... *G06F 16/2455* (2019.01); *G06F 16/2423* (2019.01); *G06F 16/24568* (2019.01);
(Continued)

(58) Field of Classification Search
CPC ............... G06F 16/2455; G06F 16/951; G06F 16/9535; G06F 16/90324; G06F 16/3332;
(Continued)

(56) References Cited

U.S. PATENT DOCUMENTS 7,937,401 B2 * 5/2011 Pasumansky ......... G06F 16/283 707/758
10,353,723 B2 * 7/2019 Hanumantharau .......................... G06F 16/2448
(Continued)

FOREIGN PATENT DOCUMENTS

EP 2463785 A1 * 6/2012
WO WO2011097057 A3 * 8/2011
(Continued)

OTHER PUBLICATIONS

N Kandavel et al "Extraction and Validation for Large Document Database by using AI", 2023 International Conference on Data Science, Agents & Artificial Intelligence (ICDSAAI), Dec. 2023.*
(Continued)

*Primary Examiner* — Srirama Channavajjala
(74) *Attorney, Agent, or Firm* — Holland & Hart, LLP.

(57) ABSTRACT

A method may include receiving, at a database that may include extension-based functionality, a database query request to perform a machine learning inference operation on data stored in the database, the machine learning inference operation to be performed at the database in accordance with the extension-based functionality. The method may include instantiating, in accordance with the extension-based functionality, a user-defined function (UDF) for performing machine learning inference operations. The method may include calling, with the UDF, the machine learning inference operation to process, at the database, the data retrieved from a table of the database. The method may include transmitting a response to the database query request, the response that may indicate an output of the machine learning inference operation, the output that may include a processed version of the data.

16 Claims, 7 Drawing Sheets

(51) Int. Cl.

| | |
|---|---|
| ***G06F 16/2455*** | (2019.01) |
| ***G06F 16/3332*** | (2025.01) |
| ***G06F 16/9032*** | (2019.01) |
| ***G06F 16/951*** | (2019.01) |
| ***G06F 16/9535*** | (2019.01) |
| ***G06N 20/00*** | (2019.01) |

(52) U.S. Cl.
CPC .... *G06F 16/3332* (2019.01); *G06F 16/90324* (2019.01); *G06F 16/951* (2019.01); *G06F 16/9535* (2019.01); *G06N 20/00* (2019.01)

(58) Field of Classification Search
CPC ............. G06F 16/3322; G06F 16/2423; G06F 16/288; G06F 16/248; G06F 16/252; G06F 16/211; G06F 40/30; G06F 40/35; G06F 16/24568; G06N 20/00; G06N 20/10; G06N 5/04; G06N 3/098; G06N 3/082; G06N 3/006
See application file for complete search history.

(56) References Cited

U.S. PATENT DOCUMENTS

| | | | | |
|---|---|---|---|---|
| 11,726,999 | B1 * | 8/2023 | Vig | G06F 16/258 707/718 |
| 11,966,396 | B1 * | 4/2024 | Finnerty | G06F 16/2433 |
| 12,430,328 | B1 * | 9/2025 | Tang | G06F 16/3338 |
| 2008/0140629 | A1 * | 6/2008 | Porter | G06F 16/284 |
| 2008/0195577 | A1 * | 8/2008 | Fan | G06F 16/24545 |
| 2013/0173509 | A1 * | 7/2013 | Bjork | G06F 18/214 706/12 |
| 2021/0406218 | A1 * | 12/2021 | Margolin | G06F 16/156 |
| 2021/0406717 | A1 * | 12/2021 | Tauheed | G06N 20/10 |
| 2022/0147516 | A1 * | 5/2022 | Tang | G06N 20/00 |
| 2022/0215008 | A1 * | 7/2022 | Adibowo | G06F 12/0802 |
| 2022/0269727 | A1 * | 8/2022 | Batsakis | G06F 16/2255 |
| 2024/0265281 | A1 * | 8/2024 | Hart | G06F 40/44 |
| 2024/0303711 | A1 * | 9/2024 | Tan | G06Q 30/0635 |
| 2025/0077524 | A1 * | 3/2025 | Lin | G06F 16/2455 |
| 2025/0124235 | A1 * | 4/2025 | Bursztyn | G06F 40/30 |
| 2025/0284721 | A1 * | 9/2025 | Agrawal | G06F 16/3329 |
| 2025/0335438 | A1 * | 10/2025 | Ngan | G06F 16/24535 |

FOREIGN PATENT DOCUMENTS

| | | | |
|---|---|---|---|
| WO | WO 2021055478 | A1 * | 3/2021 |
| WO | WO 2021236273 | A1 * | 11/2021 |
| WO | WO 2023223044 | A1 * | 11/2023 |

OTHER PUBLICATIONS

Andreas Kunft et al., “An Intermediate Representation for Optimizing Machine Learning Pipelines”, Proceedings of the VLDB Endowment, 2019, pp. 1-15.*

Mathkour, H et al., “A machine learning technique for monitoring database systems”, Proceedings IEEE Symposium on Computers and Communications, Jul. 1995, pp. 421-427.*

* cited by examiner

INTEGRATED DATABASE MACHINE LEARNING OPERATIONS

CROSS REFERENCE

The present Application for Patent claims priority to and the benefit of U.S. Patent Application No. 63/649,896 by Ghatage, entitled "INTEGRATED DATABASE MACHINE LEARNING OPERATIONS," filed May 20, 2024, assigned to the assignee hereof, and is expressly incorporated by reference in its entirety herein.

FIELD OF TECHNOLOGY

The present disclosure relates generally to database systems and data processing, and more specifically to integrated database machine learning operations.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some approaches, machine learning operations may be employed. However, such operations may be improved.

DETAILED DESCRIPTION

Some approaches for machine learning may involve the retrieval of data from a database, conversion of the data to vectors, and storage in a separate vector database, all before machine learning processes may be applied to such data. Such approaches involve large amounts of processing and complicated logic, while involving rate limiters and memory constraints, in-memory processing, all involving substantial resources. Further, such amounts of data movement and processing may involve long processing times, slowing down processing and diminishing the efficiency of system operations, as well as involving additional considerations regarding data residency. Further, such additional data movement and processing increases opportunities for data leakage, bugs, or exploits.

The techniques described herein involve in-place processing of data stored in a database by machine learning operations. For example, a database may include extension capabilities, which may allow user defined functions or code (including machine learning operations) to be run at the database to process data (e.g., instead of retrieving the data, vectorizing, transferring to another vector database, and then processing the data with machine learning techniques. For example, the retrieval of data, machine learning processing, and production of output data may be integrated into a database query execution flow (e.g., a flow for requesting retrieval of data from the database).

In at least these ways, data movement may be reduced, reducing processing and storage demands as well as opportunities for data leakage or exploits. Turnaround time may be reduced and the data may be processed more efficiently and responses may be provided to the user more quickly. Further, some processing operations (e.g., encryption or serializing operations) may be reduced or eliminated, as such operations may no longer be necessary as the techniques described herein are performed at the database and data movement is not needed. Security of the data may be increased and compliance with data residency considerations may be improved. Further, by employing the use of extensions at the database, deployment of elements at the database is simplified. Auditing of the data at the database and the processes performed at the database becomes simpler, as everything is performed at the database.

Aspects of the disclosure are initially described in the context of an environment supporting an on-demand database service. Aspects of the disclosure are then described with reference to a database processing system and a process flow. Aspects of the disclosure are further illustrated by and described with reference to apparatus diagrams, system diagrams, and flowcharts that relate to integrated database machine learning operations.

Figure 1:
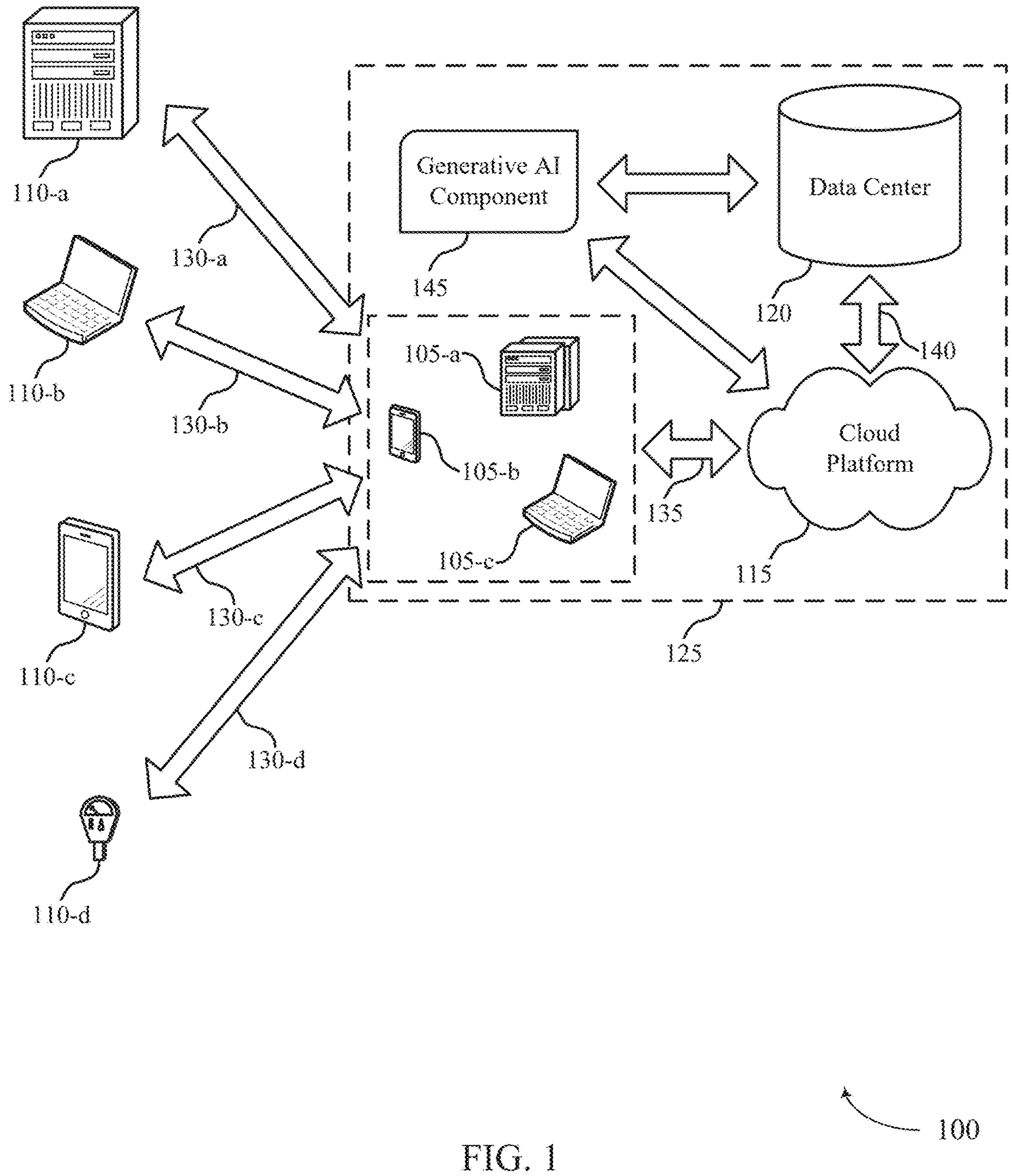
FIG. 1 illustrates an example of a data processing system that supports integrated database machine learning operations in accordance with examples as disclosed herein.

FIG. 1 illustrates an example of a system 100 for cloud computing that supports integrated database machine learning operations in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

In some examples, the system 100 may include a generative artificial intelligence (AI) component 145. The generative AI component 145 may be an example or a component of a large language model (LLM), such as a generative AI model. In some examples, the generative AI component 145 may additionally, or alternatively, be referred to as any of an AI, a generative AI (GAI), a GAI model, an LLM, a machine learning model, or any similar terminology. The generative AI component 145 may be a model that is trained on a corpus of input data, which may include text, images, video, audio, structured data, or any combination thereof. Such data may represent general-purpose data, domain-specific data, or any combination thereof. Further, the generative AI component 145 may be supplemented with additional training on data associated with a role, function, or generation outcome to further specialize the generative AI component 145 and increase the accuracy and relevance of information generated with the generative AI component 145.

In some examples, the cloud platform 115 may receive a query from a cloud client 105 that may include a request to produce a response (e.g., text, images, video, audio, or other information) to the query using the generative AI component 145. The cloud platform 115 may input a prompt to the generative AI component 145 that includes, or otherwise indicates, the query (or information included therein). The generative AI component 145 may generate an output (e.g., text, images, video, audio, or other information) that is responsive to the prompt. In some examples, the cloud platform 115 may modify or supplement one or more aspects of the query to increase the quality of the response. In some examples, such modification or supplementation may be referred to as grounding.

The system 100 may support any configuration for the use of generative AI models. In FIG. 1, the generative AI component 145 is depicted as being located external to the subsystem 125. However, the generative AI component 145 may be hosted on the cloud platform 115, elsewhere within the subsystem 125, or outside the subsystem 125 (e.g., a publicly-hosted platform). Additionally, or alternatively, multiple generative AI components 145 may be employed to perform one or more of the actions described as being performed by a single generative AI component 145. Further, in some examples, the generative AI component 145 may communicate with one or more other elements, such as a contact 110, the data center 120, one or more other elements, or any combination thereof, to receive additional information (e.g., that may be indicated in the query or the prompt) that is to be considered for performing generative processes.

In various implementations, the models and/or modules described herein (e.g., including, but not limited to, the generative AI component 145) may be classification, predictive, generative, conversational, or another form of AI technology, such as AI model(s), agents, etc., implementing one or more forms of machine learning, a neural network, statistical modeling, deep learning, automation, natural language processing, or other similar technology. The AI technology may be included as part of a network or system comprising a hardware- or software-based framework for training, processing, fine-tuning, or performing any other implementation steps. Furthermore, the AI technology may include a hardware- or software-based framework that performs one or more functions, such as retrieving, generating, accessing, transmitting, etc. The AI technology may be implemented by a computer including a register coupled with a processor or a central processing unit (CPU).

Moreover, the AI technology may be trained or fine-tuned using supervised, unsupervised, or other AI training techniques. In various implementations, the AI technology may be trained or fine-tuned using a set of general datasets or a set of datasets directed to a particular field or task. Additionally, or alternatively, the AI technology may be intermittently updated at a set interval or in real time based on resulting output or additional data to further train the AI technology. The AI technology may offer a variety of capabilities including text, audio, image, and other content generation, translation, summarization, classification, prediction, recommendation, time-series forecasting, searching, matching, pairing, and more. These capabilities may be provided in the form of output produced by the AI technology in response to a particular prompt or other input. Furthermore, the AI technology may implement Retrieval-Augmented Generation (RAG) or other techniques after training or fine-tuning by accessing a set of documents or knowledge base directed to a particular field or website other than the training or fine-tuning data to influence the AI technology's output with the set of documents or knowledge base.

To further guide and train output of the AI technology, one or more input prompts may be provided to the AI technology for the purpose of eliciting particular responses. In various implementations, the input prompts may correspond to the particular field or task to which the AI technology is trained. Additionally, or alternatively, the AI technology may be implemented along with one or more additional AI technologies. For example, a first AI model may produce a first output, which is used as input for a second AI model to produce a second output. These AI technologies may be used in succession of one another, in parallel with another, or a combination of both. Furthermore, the AI technologies may be merged in a variety of implementations, for example, by bagging, boosting, stacking, etc. the AI technologies.

Some approaches to database management may suffer from technical issues. For example, such approaches may only offer rudimentary filtering at the database, which may involve large amounts of processing and complicated logic to implement filtering solutions and may not be scalable. Further, such rudimentary filtering may not meet expectations for processing (e.g., as compared to processing performed elsewhere). In some approaches, the filtering may not be performed at the database at all, instead being performed at back-end processing (e.g., that may interface with the database remotely). However, such approaches may involve the use of rate limiters, memory constraints, and in-memory processing, all involving substantial resources. Further, such amounts of data movement and processing may involve long processing times, slowing down processing and diminishing the efficiency of system operations, as well as involving additional considerations regarding data residency. Further, such additional data movement and processing increases opportunities for data leakage, bugs, or exploits.

The techniques described herein may involve performing filtering or other processing at the database, before transmission to a remote location (e.g., a back-end application that requests information from the database). For example, any processing performed at a remote location performed on data retrieved from the database that would otherwise be processed at the remote location may be performed at the database. For example, a cloud client 105 may transmit a request to the cloud platform 115 to retrieve and process one or more data elements stored at a database of the cloud platform 115 (e.g., the data center 120, which may be included in the cloud platform and which may include extension-based functionality). The query may include a request to perform a machine learning inference operation on data stored at the database, where the machine learning inference operation is to be performed at the database in accordance with the extension-based functionality. The cloud platform 115 may instantiate (e.g., at the database), in accordance with the extension-based functionality, a user-defined function (UDF) for performing machine learning inference operations at the database. The cloud platform 115 may (e.g., at the database) call the machine learning inference operation to process the data retrieved from a table of the database. The application server may (e.g., at the database) transmit a response to the database query request, the response indicating or including an output of the machine learning inference operation, the output comprising a processed version of the data. The cloud client 105 may then receive the response that indicates or includes the output. By doing so, fewer points of failure (e.g., for bugs, data leakage, exploits, or other failures) are present in the overall system. Further, compliance with data security considerations (e.g., data residency considerations) may be increased, as processing may be performed locally at the database, which may permit transmission of processed data (e.g., masked data) that may be in increased compliance with such considerations. Further, by providing powerful processing capabilities at the database itself, the database may perform substantial processing on the data before providing the data to the remote locations that requested the data. As a result, processing at the remote locations may be streamlined, resulting in increased efficiency and speed at the remote locations. Further, auditing of the processing tasks (e.g., to determine compliance with privacy or security considerations) may be easier, as the processing tasks are performed at the database and not at disparate remote locations.

It should be appreciated by a person skilled in the art that one or more aspects of the disclosure may be implemented in a system 100 to additionally, or alternatively, solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
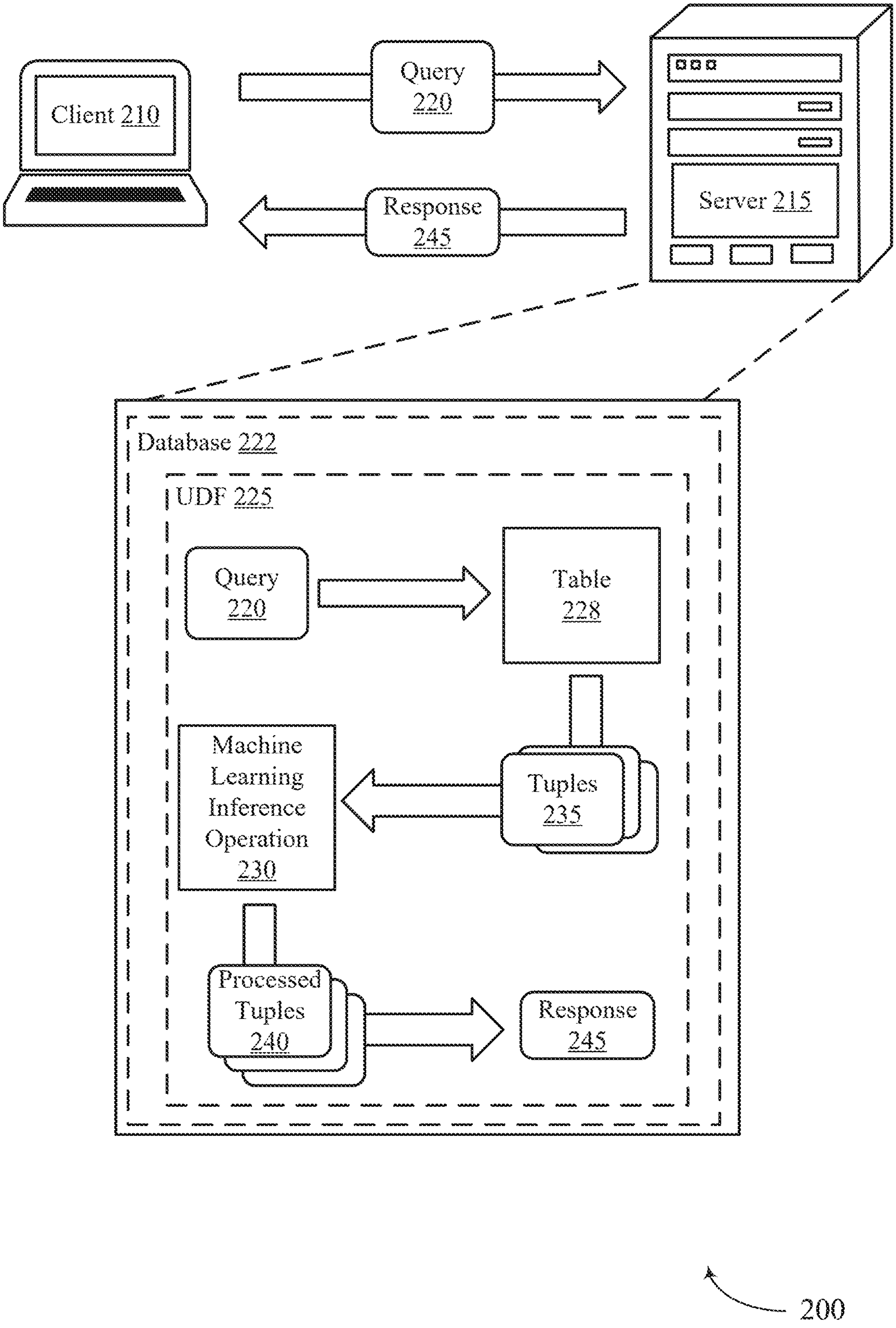
FIG. 2 shows an example of a database processing system that supports integrated database machine learning operations in accordance with examples as disclosed herein.

FIG. 2 shows an example of a database processing system 200 that supports integrated database machine learning operations in accordance with examples as disclosed herein. The database processing system 200 may include the client 210 and the server 215.

Some approaches for machine learning may involve retrieval of data from a database, incorporation of that data into vectors, and subsequent writing of the vectors into a vector database, where it may then be processed by a machine learning model or operation. Such approaches may involve intricate, complicated logic at the application level. For example, such logic may include reading data from the database while compensating or accounting for rate limiters and memory constraints, processing the in-memory data while considering memory and CPU limitations, and writing the data back to a vector database while considering write rate limiters, CPU, and memory constraints. Such processes may be resource intensive and costly.

Such techniques may result in significant quantities of data movement that occur before any machine learning applications can be utilized. The total time to make this data usable or processable by machine learning techniques may be extensive, slowing down processing and reducing efficiency of system operations. Further, in situations in which the database storing the data is located in one country and the application is deployed in another, the situation becomes more complex, as data residency considerations become involved. Further, if a security bug or exploit exists in such techniques (e.g., those involving how the application processes and reads or writes the data), there may be a risk of data exposure or leakage.

The techniques proposed here allow for data manipulation without the need for the data leaving the database 222. For example, many operations, such as data retrieval, machine learning processing, and production of a response to queries (as well as any other techniques described herein) may be performed using application-level logic that operates at the database 222 itself. In some examples, this may be achieved by embedding machine learning inference operations, such as the machine learning inference operation 230, into the database's 222 query execution.

This approach may result in several unique outcomes. For example, there may be little to no data movement as the data may not need to be read from the database 222, reducing total turnaround time, as many operations may be reduced or eliminated, such as serializing, deserializing, encrypting, decrypting, one or more other operations, or any combination thereof. Further, data security may be significantly improved as the data may not leave the database 222 (e.g., during processing or before transmitting a final result to the client 210), potentially reducing or eliminating any bugs incurred while processing the data. Additionally, or alternatively, compliance with data residency considerations may be improved, as the data (e.g., the tuples 235) may not leave the country of origin where it remains at rest at the database 222.

In some examples, such operations may be performed using a Postrgres architecture, a shim database, a sequel database, or another database. In some examples, the techniques described herein may be performed on any database that offers extension-based functionality. For example, Postgres databases may permit the use of extensions, which may allow third-party code (e.g., the UDF 225) to be executed as a user-defined function or structured query language (SQL). By incorporating the machine learning inference operation 230 or any other machine learning operation into a Postgres extension or other type of database extension, it becomes accessible at the database (e.g., SQL) level. Additionally, a user-defined function (UDF) is provided to process the data, which may also be performed in accordance with the use of extensions at the database.

In some examples, an execution flow may now proceed as follows: a user calls the UDF 225, which internally queries the table 228 of the database 222. The UDF 225 may initiate streaming of the tuples 235 based on the query 220. The UDF may call the machine learning inference operation 230 from the extension for each tuple 235, processes the tuple 235, and returns the tuple (e.g., as a processed tuple 240) to the user (e.g., in the response 245). In this manner, the model inference is integrated into the query execution flow by processing the tuples 235 (e.g., resulting in the processed tuples 240) before they are returned to the user.

Such techniques may be applied in many different use cases, particularly in the embedding, security, and inference of data. For example, such techniques may be used to intelligently "mask" data without rule-based masking, instead employing machine learning operations at the database level, thus reducing or eliminating data leakage, such as PII.

For example, the database 222 may be a source of truth for sensitive information. A backend application (e.g., the database 222) at the database 222 may read the data (e.g., the tuples 235), mask the data (e.g., via processing at the machine learning inference operation 230 to produce the processed tuples 240, which may include masked data), and transmit the masked data (e.g., the processed tuples 240) to the user via a user-facing application (e.g., in the response 245). In some examples, both the database 222 and the backend application may be within the same logical boundary (e.g., the database 222). This is in contrast to other approaches, such as those involving microservice architecture, in which they operate on separate environments or logical divisions, which opens the door for exploits.

By masking data at the database 222, fewer points of failure are present. the more disjointed the microservices are, the more onus is on individual teams to protect data being exchanged. Better auditing is provided, as the masking is done at the application level, which may involve audit logging enabled at multiple levels to trace data access. Further, such approaches may involve improved compliance with data residency considerations, as many jurisdictions may have their own data residency considerations. In some approaches, not all cloud substrates that are provided within those jurisdictions have feature parity.

Such approaches also improve the use of machine learning and/or generative artificial intelligence models. For example, in data processing, artificial intelligence (AI) and generative AI may be probabilistic, but idempotency and consistency are valued. Though generative AI have much potential, such approaches may be probabilistic in nature, possibly resulting in different answers to the same queries on different iterations. For production software and security, such probabilistic operations may be less desirable. Further, in terms of data security, some users or administrators may not want data to be shared to public generative AI models.

In some examples, grammar based decoding may be used to structure text generation to be confined to structured data formats (e.g., JavaScript Object Notation (JSON)). This makes the outputs more predictable in structure and formatting. In some examples, a prompt to a processing model (e.g., a generative AI model) may include such instructions or constraints to process inputs (e.g., in the prompt) as structured data and to provide a response to the prompt in structured data. Additionally, or alternatively, techniques may involve the use of local quantized models such as distilbert-NER or Mistral-7b. Such 8-bit quantized models may provide similar performance to original models, but without additional processing hardware (e.g., graphics processing units (GPUs)) can be hosted locally, can be embedded into existing systems, and still function well.

The server 215 may receive the query 220. The query 220 may include a request to perform the machine learning inference operation 230 on data (e.g., the tuples 235) stored in the database. In some examples, the machine learning inference operation 230 is to be performed at the database in accordance with the extension-based functionality. The application server may instantiate, in accordance with the extension-based functionality, a UDF, such as the UDF 225, for performing machine learning inference operations. The server 215 may call the machine learning inference operation 230 to process the data (e.g., the tuples 235) retrieved from a table 228 of the database. The machine learning inference operation 230 may process the data (e.g., the tuples 235) and may produce the processed tuples 240. For example, such processing may include masking of data (e.g., personally identifying information (PII) or any other machine learning processing). The server 215 may include the processed data (e.g., the processed tuples 240) in the response 245 and may transmit the response 245 to the client 205.

In some examples, models employed for the machine learning inference operation 230 may be a local model, such as a quantized local model. The use of such a model may reduce the amount of processing resources consumed at the database 222 or allow for different processing resources or hardware to be employed to support any of the techniques described herein.

In some examples, the machine learning inference operation 230 (e.g., as performed by a generative AI model, for example) may perform processing of the tuples 235 on a one-by-one basis. For example, the machine learning inference operation 230 may process a first tuple 235 (e.g., based on a prompt that include the first tuple) and may provide a response (e.g., a response to the prompt) that may include a processed tuple 240 that corresponds with the first tuple 235, but that includes the result of processing (e.g., data masking in accordance with one or more masking rules, which may be provided in the prompt).

In some examples, the machine learning inference operation 230 may perform complex processing based on multiple fields of the tuples 235. For example, each tuple 235 may include multiple fields or elements (e.g., name, job title, and location). The machine learning inference operation 230 may be performed to filter, mask, or otherwise process the tuples 235 based on one or more rules that consider a combination of multiple fields or elements. For example, a rule or input may indicate that the machine learning inference operation 230 is to mask information associated with those records that have a job title of "associate" and that have a location of "Los Angeles." For example, a prompt provided to a generative AI model may include an indication of one or more such rules (e.g., to consider multiple fields or elements of tuples), an indication of which fields or values thereof are to trigger one or more operations under the rules (e.g., a particular job title and a particular location, for example), one or more other parameters, or any combination thereof.

Further, in some examples, a generative AI model may infer one or more characteristics or operations associated with the tuples 235. For example, given a database of fruits, a user may request filtering or other processing of red fruits. In some examples, the tuples 235 may not include a field or information about the color of the fruits in the database. However, the generative AI model may be able to infer information about the fruits listed in the database and identify apples listed in the database to be selected for processing or for identification or retrieval in response to the request for red fruits.

Figure 3:
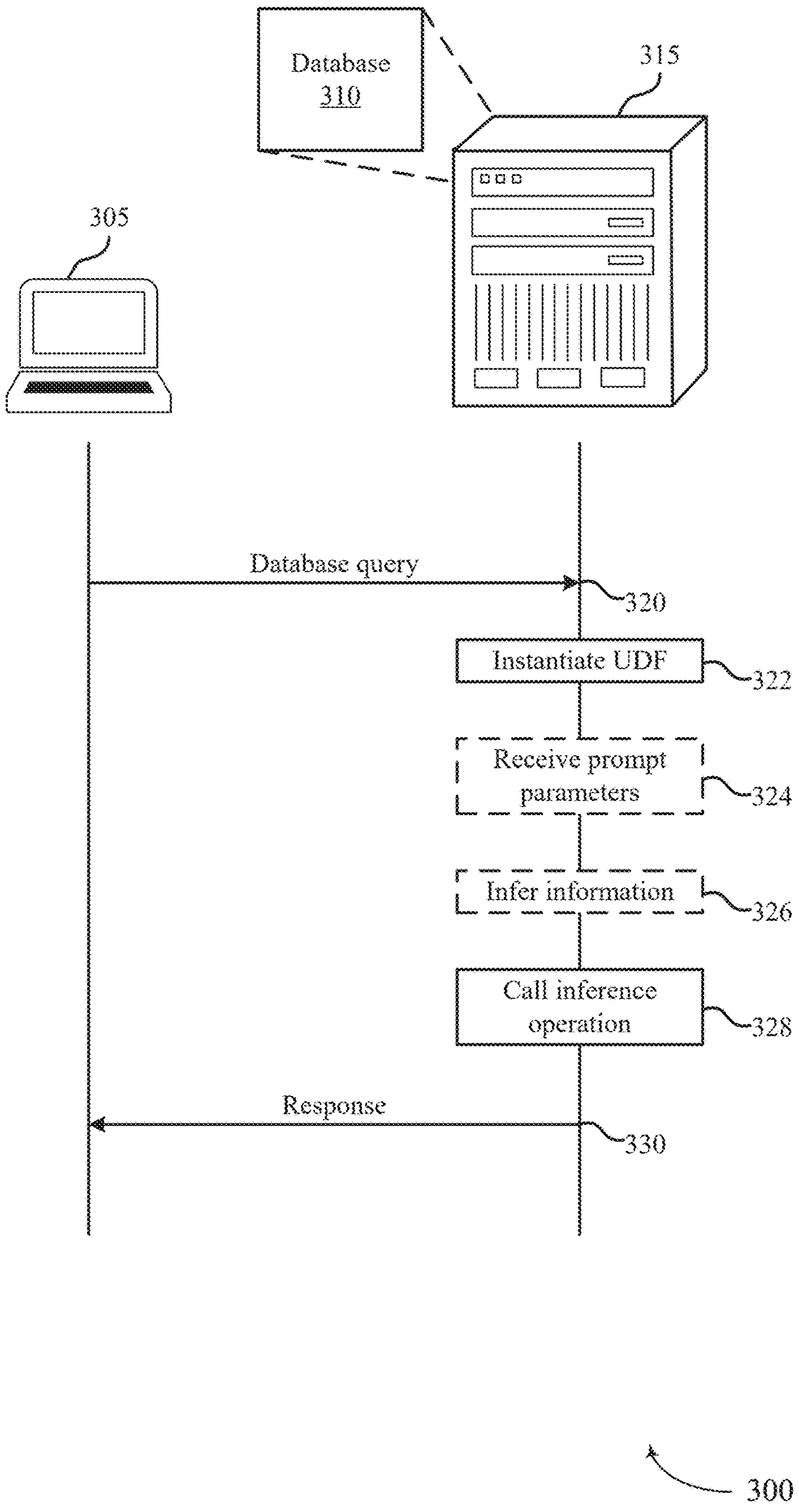
FIG. 3 shows an example of a process flow that supports integrated database machine learning operations in accordance with examples as disclosed herein.

FIG. 3 shows an example of a process flow 300 that supports integrated database machine learning operations in accordance with examples as disclosed herein. The process flow 300 may implement various aspects of the present disclosure described herein. The elements described in the process flow 300 (e.g., application server 315, client 305, and database 310) may be examples of similarly named elements described herein.

In the following description of the process flow 300, the operations between the various entities or elements may be performed in different orders or at different times. Some operations may also be left out of the process flow 300, or other operations may be added. Although the various entities or elements are shown performing the operations of the process flow 300, some aspects of some operations may also be performed by other entities or elements of the process flow 300 or by entities or elements that are not depicted in the process flow, or any combination thereof.

At 320, the application server 315 may receive (e.g., from the client 305), at a database 310 that may include extension-based functionality, a database query request to perform a machine learning inference operation on data stored in the database 310 and the machine learning inference operation is to be performed at the database 310 in accordance with the extension-based functionality. In some examples, the data may include a plurality of tuples stored at the database 310. In some examples, the database 310 is a structured query language (SQL) database or a Postgres-based database.

At 322, the application server 315 may instantiate, in accordance with the extension-based functionality, a user-defined function (UDF) for performing machine learning inference operations.

At 324, the application server 315 may receive (e.g., from the client 305) an indication of one or more prompt parameters that are to be included in the prompt. In some examples, the one or more prompt parameters comprise an instruction to provide a structured data output in response to a structured data input in the prompt. In some examples, the one or more prompt parameters comprise one or more indications of operations that are to be performed in the machine learning inference operation.

At 326, the application server 315 may infer, with the machine learning inference operation, information that is associated with one or more tuples of the plurality of tuples and that is not included in a tuple element of the one or more tuples of the plurality of tuples. In some examples, the machine learning inference operation is based on the information.

At 328, the application server 315 may call, with the UDF, the machine learning inference operation to process, at the database 310, the data retrieved from a table of the database 310. in some examples, the machine learning inference operation processes the data on a tuple-by-tuple basis. In some examples, processing the data on a tuple-by-tuple basis may include processing the plurality of tuples based on a first parameter associated with a first tuple element included in each tuple of the plurality of tuples and further based on a second parameter associated with a second tuple element included in each tuple of the plurality of tuples. In some examples, calling the inference operation may include providing a prompt that indicates the data to a processing model that performs the machine learning inference operation. In some examples, calling the inference operation may include receiving the response from the processing model, the response that may include the processed version of the data. In some examples, the processing model is a quantized local processing model. In some examples, the machine learning inference operation masks one or more elements of the data.

At 330, the application server 315 may transmit a response to the database query request, the response indicating an output of the machine learning inference operation, the output that may include a processed version of the data.

Figure 4:
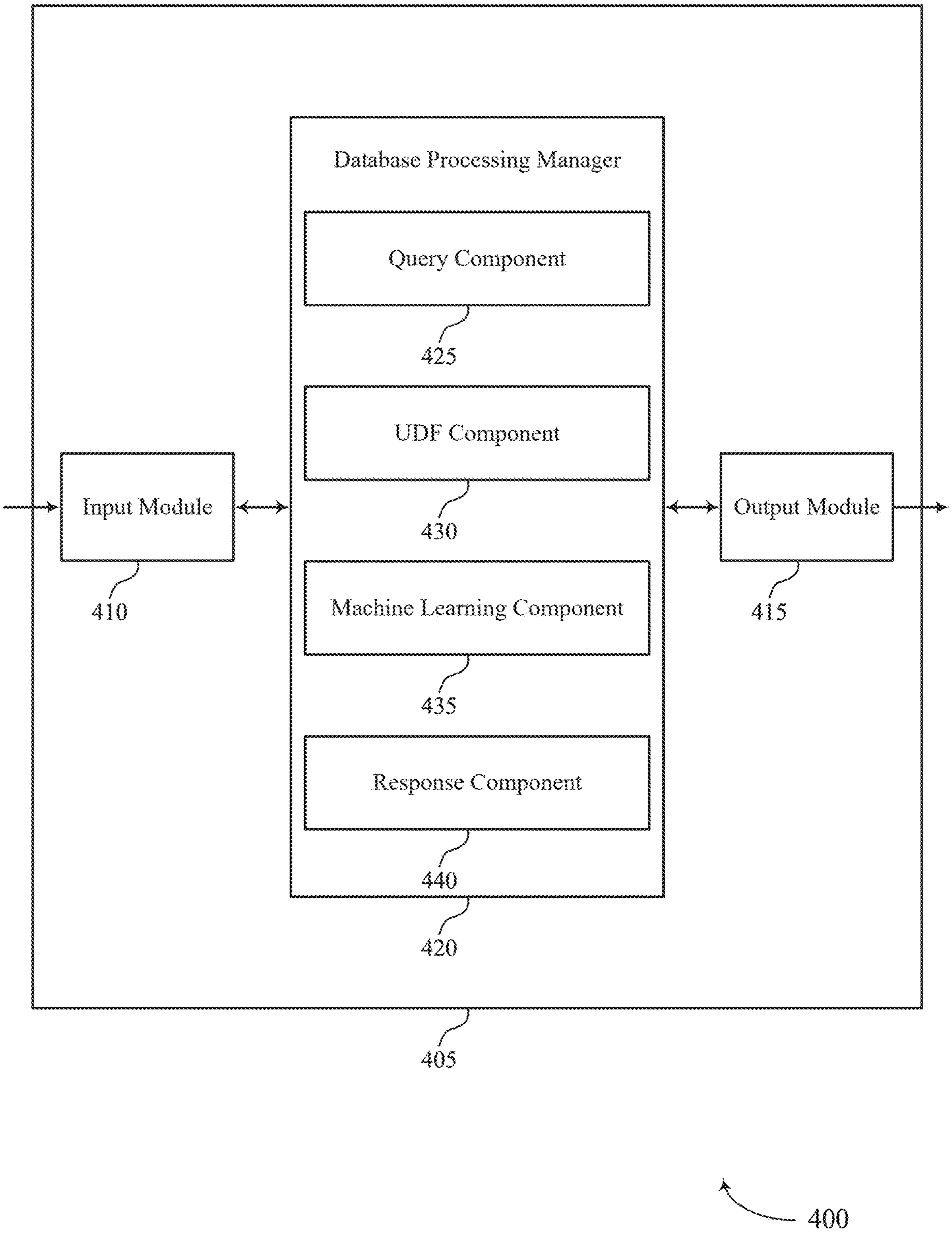
FIG. 4 shows a block diagram of an apparatus that supports integrated database machine learning operations in accordance with examples as disclosed herein.

FIG. 4 shows a block diagram 400 of a device 405 that supports integrated database machine learning operations in accordance with examples as disclosed herein. The device 405 may include an input module 410, an output module 415, and a database processing manager 420. The device 405, or one or more components of the device 405 (e.g., the input module 410, the output module 415, the database processing manager 420), may include at least one processor, which may be coupled with at least one memory, to support the described techniques. Each of these components may be in communication with one another (e.g., via one or more buses).

The input module 410 may manage input signals for the device 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the device 405 for processing. For example, the input module 410 may transmit input signals to the database processing manager 420 to support integrated database machine learning operations. In some cases, the input module 410 may be a component of an input/output (I/O) controller 610 as described with reference to FIG. 6.

The output module 415 may manage output signals for the device 405. For example, the output module 415 may receive signals from other components of the device 405, such as the database processing manager 420, and may transmit these signals to other components or devices. In some examples, the output module 415 may transmit output signals for display in a user interface, for storage in a database or data store, for further processing at a server or server cluster, or for any other processes at any quantity of devices or systems. In some cases, the output module 415 may be a component of an I/O controller 610 as described with reference to FIG. 6.

For example, the database processing manager 420 may include a query component 425, a UDF component 430, a machine learning component 435, a response component 440, or any combination thereof. In some examples, the database processing manager 420, or various components thereof, may be configured to perform various operations (e.g., receiving, monitoring, transmitting) using or otherwise in cooperation with the input module 410, the output module 415, or both. For example, the database processing manager 420 may receive information from the input module 410, send information to the output module 415, or be integrated in combination with the input module 410, the output module 415, or both to receive information, transmit information, or perform various other operations as described herein.

The database processing manager 420 may support data processing in accordance with examples as disclosed herein. The query component 425 may be configured to support receiving, at a database that includes extension-based functionality, a database query request to perform a machine learning inference operation on data stored in the database, where the machine learning inference operation is to be performed at the database in accordance with the extension-based functionality. The UDF component 430 may be configured to support instantiating, in accordance with the extension-based functionality, a user-defined function (UDF) for performing machine learning inference operations. The machine learning component 435 may be configured to support calling, with the UDF, the machine learning inference operation to process, at the database, the data retrieved from a table of the database. The response component 440 may be configured to support transmitting a response to the database query request, the response indicating an output of the machine learning inference operation, the output including a processed version of the data.

Figure 5:
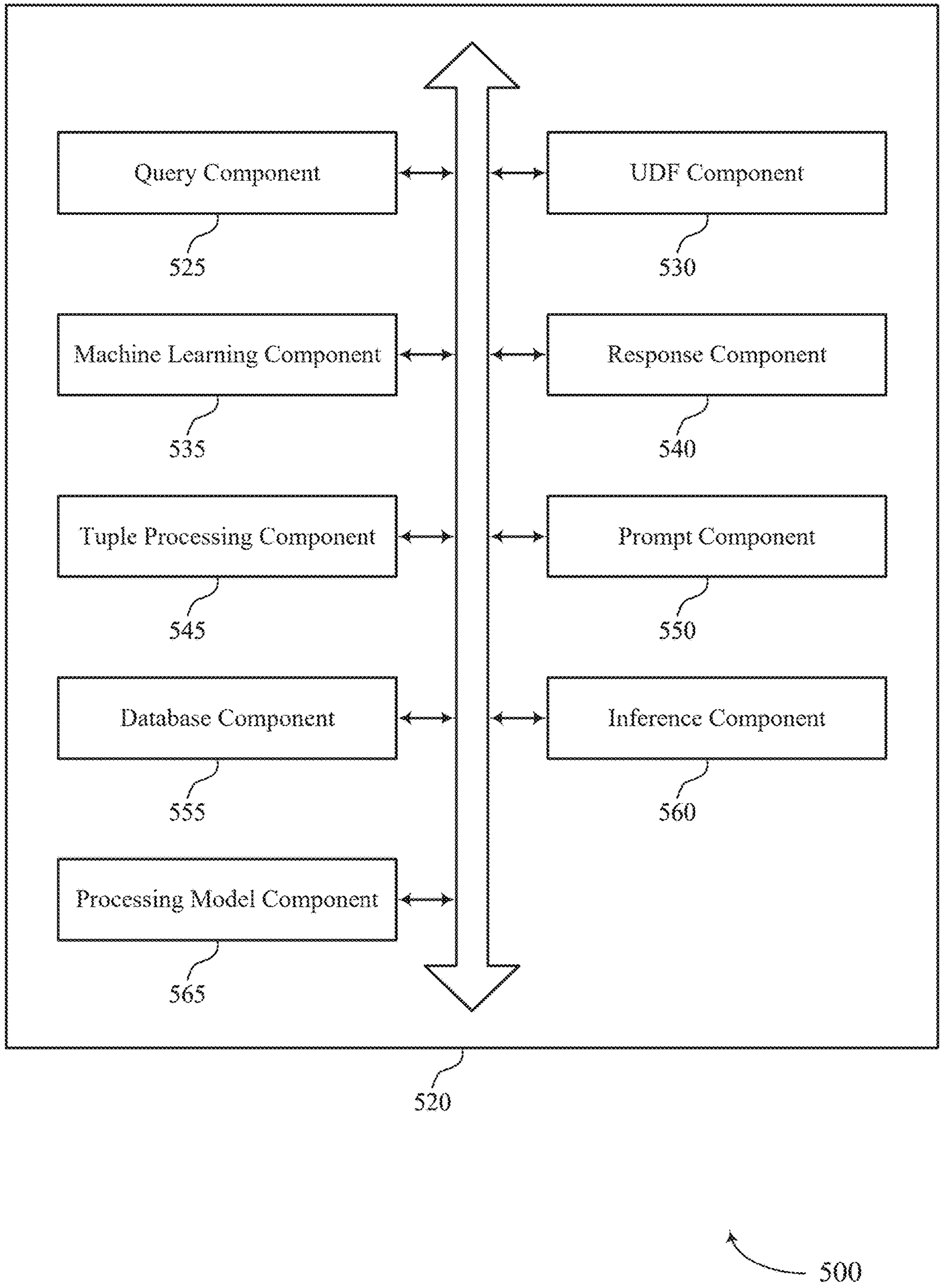
FIG. 5 shows a block diagram of a database processing manager that supports integrated database machine learning operations in accordance with examples as disclosed herein.

FIG. 5 shows a block diagram 500 of a database processing manager 520 that supports integrated database machine learning operations in accordance with examples as disclosed herein. The database processing manager 520 may be an example of aspects of a database processing manager or a database processing manager 420, or both, as described herein. The database processing manager 520, or various components thereof, may be an example of means for performing various aspects of integrated database machine learning operations as described herein. For example, the database processing manager 520 may include a query component 525, a UDF component 530, a machine learning component 535, a response component 540, a tuple processing component 545, a prompt component 550, a database component 555, an inference component 560, a processing model component 565, or any combination thereof. Each of these components, or components of subcomponents thereof (e.g., one or more processors, one or more memories), may communicate, directly or indirectly, with one another (e.g., via one or more buses).

The database processing manager 520 may support data processing in accordance with examples as disclosed herein. The query component 525 may be configured to support receiving, at a database that includes extension-based functionality, a database query request to perform a machine learning inference operation on data stored in the database, where the machine learning inference operation is to be performed at the database in accordance with the extension-based functionality. The UDF component 530 may be configured to support instantiating, in accordance with the extension-based functionality, a user-defined function (UDF) for performing machine learning inference operations. The machine learning component 535 may be configured to support calling, with the UDF, the machine learning inference operation to process, at the database, the data retrieved from a table of the database. The response component 540 may be configured to support transmitting a response to the database query request, the response indicating an output of the machine learning inference operation, the output including a processed version of the data.

In some examples, the data includes a set of multiple tuples stored at the database. In some examples, the machine learning inference operation processes the data on a tuple-by-tuple basis.

In some examples, to support processing the data on a tuple-by-tuple basis, the tuple processing component 545 may be configured to support processing the set of multiple tuples based on a first parameter associated with a first tuple element included in each tuple of the set of multiple tuples and further based on a second parameter associated with a second tuple element included in each tuple of the set of multiple tuples.

In some examples, the inference component 560 may be configured to support inferring, with the machine learning inference operation, information that is associated with one or more tuples of the set of multiple tuples and that is not included in a tuple element of the one or more tuples of the set of multiple tuples. In some examples, the inference component 560 may be configured to support where the machine learning inference operation is based on the information.

In some examples, to support calling the machine learning inference operation, the prompt component 550 may be configured to support providing a prompt that indicates the data to a processing model that performs the machine learning inference operation. In some examples, to support calling the machine learning inference operation, the response component 540 may be configured to support receiving the response from the processing model, the response including the processed version of the data.

In some examples, the prompt component 550 may be configured to support receiving an indication of one or more prompt parameters that are to be included in the prompt.

In some examples, the one or more prompt parameters include an instruction to provide a structured data output in response to a structured data input in the prompt.

In some examples, the one or more prompt parameters include one or more indications of operations that are to be performed in the machine learning inference operation.

In some examples, the processing model is a quantized local processing model.

In some examples, the database is a structured query language (SQL) database or a Postgres-based database.

In some examples, the machine learning inference operation masks one or more elements of the data.

Figure 6:
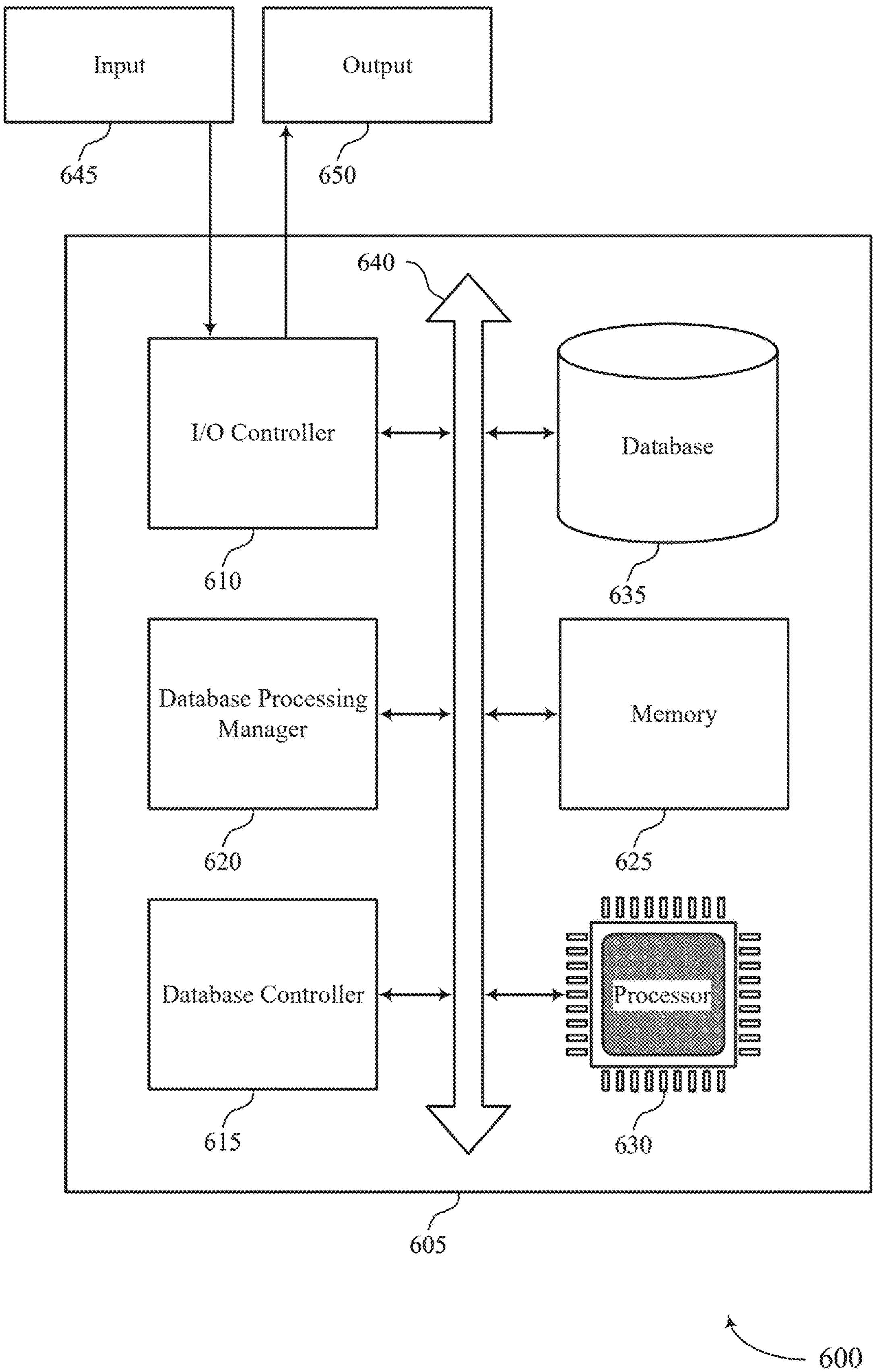
FIG. 6 shows a diagram of a system including a device that supports integrated database machine learning operations in accordance with examples as disclosed herein.

FIG. 6 shows a diagram of a system 600 including a device 605 that supports integrated database machine learning operations in accordance with examples as disclosed herein. The device 605 may be an example of or include components of a device 405 as described herein. The device 605 may include components for bi-directional data communications including components for transmitting and receiving communications, such as a database processing manager 620, an I/O controller, such as an I/O controller 610, a database controller 615, at least one memory 625, at least one processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of a processor 630. In some examples, a user may interact with the device 605 via the I/O controller 610 or via hardware components controlled by the I/O controller 610.

The database controller 615 may manage data storage and processing in a database 635. In some cases, a user may interact with the database controller 615. In other cases, the database controller 615 may operate automatically without user interaction. The database 635 may be an example of a single database, a distributed database, multiple distributed databases, a data store, a data lake, or an emergency backup database.

Memory 625 may include random-access memory (RAM) and read-only memory (ROM). The memory 625 may store computer-readable, computer-executable software including instructions that, when executed, cause at least one processor 630 to perform various functions described herein. In some cases, the memory 625 may contain, among other things, a basic I/O system (BIOS) which may control basic hardware or software operation such as the interaction with peripheral components or devices. The memory 625 may be an example of a single memory or multiple memories. For example, the device 605 may include one or more memories 625.

The processor 630 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in at least one memory 625 to perform various functions (e.g., functions or tasks supporting integrated database machine learning operations). The processor 630 may be an example of a single processor or multiple processors. For example, the device 605 may include one or more processors 630.

The database processing manager 620 may support data processing in accordance with examples as disclosed herein. For example, the database processing manager 620 may be configured to support receiving, at a database that includes extension-based functionality, a database query request to perform a machine learning inference operation on data stored in the database, where the machine learning inference operation is to be performed at the database in accordance with the extension-based functionality. The database processing manager 620 may be configured to support instantiating, in accordance with the extension-based functionality, a user-defined function (UDF) for performing machine learning inference operations. The database processing manager 620 may be configured to support calling, with the UDF, the machine learning inference operation to process, at the database, the data retrieved from a table of the database. The database processing manager 620 may be configured to support transmitting a response to the database query request, the response indicating an output of the machine learning inference operation, the output including a processed version of the data.

By including or configuring the database processing manager 620 in accordance with examples as described herein, the device 605 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

Figure 7:
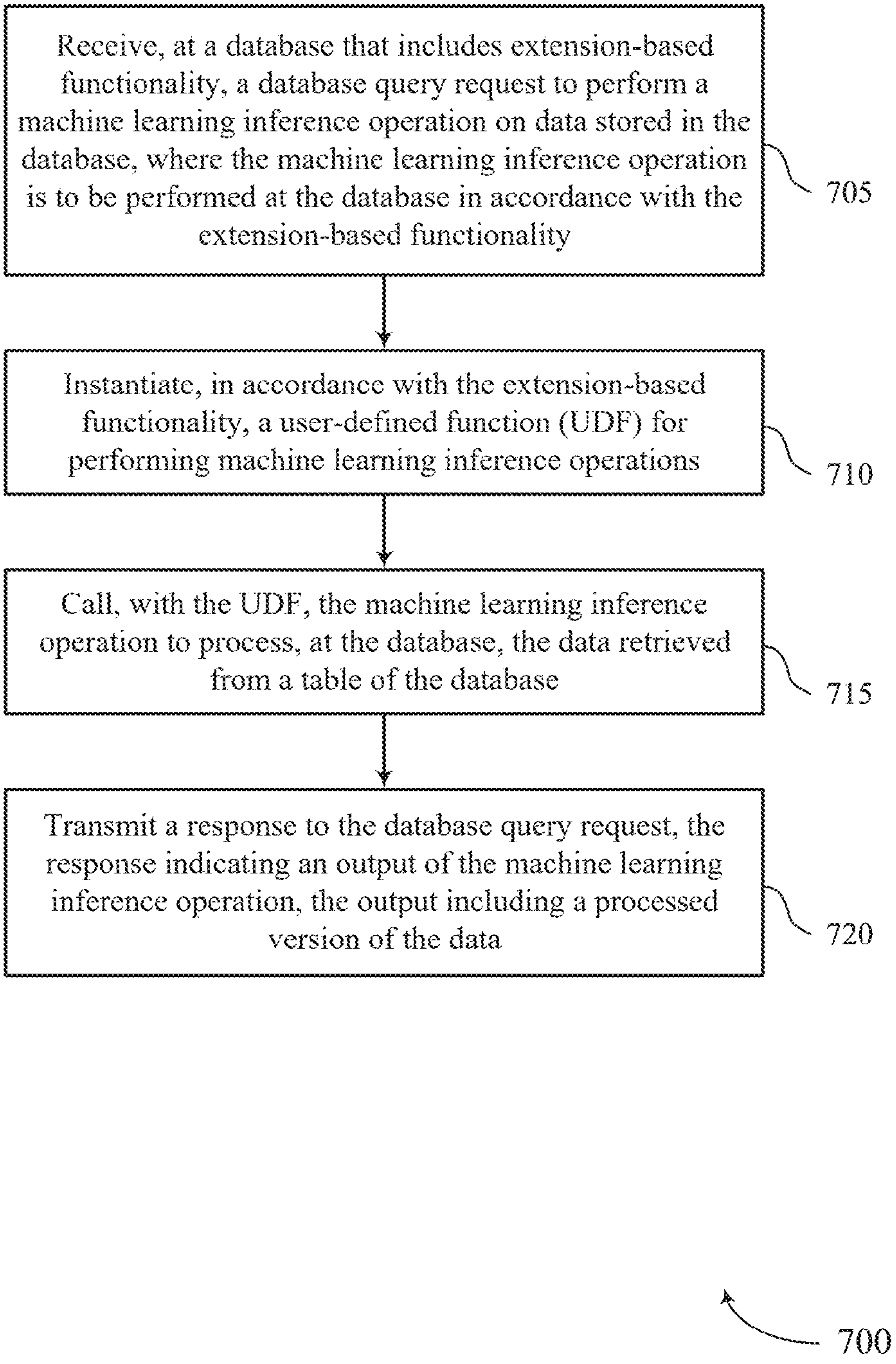
FIG. 7 shows a flowchart illustrating methods that support integrated database machine learning operations in accordance with examples as disclosed herein.

FIG. 7 shows a flowchart illustrating a method 700 that supports integrated database machine learning operations in accordance with examples as disclosed herein. The operations of the method 700 may be implemented by an application server or its components as described herein. For example, the operations of the method 700 may be performed by an application server as described with reference to FIGS. 1 through 6. In some examples, an application server may execute a set of instructions to control the functional elements of the application server to perform the described functions. Additionally, or alternatively, the application server may perform aspects of the described functions using special-purpose hardware.

At 705, the method may include receiving, at a database that includes extension-based functionality, a database query request to perform a machine learning inference operation on data stored in the database, where the machine learning inference operation is to be performed at the database in accordance with the extension-based functionality. The operations of 705 may be performed in accordance with examples as disclosed herein. In some examples, aspects of the operations of 705 may be performed by a query component 525 as described with reference to FIG. 5.

At 710, the method may include instantiating, in accordance with the extension-based functionality, a user-defined function (UDF) for performing machine learning inference operations. The operations of 710 may be performed in accordance with examples as disclosed herein. In some examples, aspects of the operations of 710 may be performed by a UDF component 530 as described with reference to FIG. 5.

At 715, the method may include calling, with the UDF, the machine learning inference operation to process, at the database, the data retrieved from a table of the database. The operations of 715 may be performed in accordance with examples as disclosed herein. In some examples, aspects of the operations of 715 may be performed by a machine learning component 535 as described with reference to FIG. 5.

At 720, the method may include transmitting a response to the database query request, the response indicating an output of the machine learning inference operation, the output including a processed version of the data. The operations of 720 may be performed in accordance with examples as disclosed herein. In some examples, aspects of the operations of 720 may be performed by a response component 540 as described with reference to FIG. 5.

A method for data processing by an apparatus is described. The method may include receiving, at a database that includes extension-based functionality, a database query request to perform a machine learning inference operation on data stored in the database, where the machine learning inference operation is to be performed at the database in accordance with the extension-based functionality, instantiating, in accordance with the extension-based functionality, a user-defined function (UDF) for performing machine learning inference operations, calling, with the UDF, the machine learning inference operation to process, at the database, the data retrieved from a table of the database, and transmitting a response to the database query request, the response indicating an output of the machine learning inference operation, the output including a processed version of the data.

An apparatus for data processing is described. The apparatus may include one or more memories storing processor executable code, and one or more processors coupled with the one or more memories. The one or more processors may individually or collectively be operable to execute the code to cause the apparatus to receive, at a database that includes extension-based functionality, a database query request to perform a machine learning inference operation on data stored in the database, where the machine learning inference operation is to be performed at the database in accordance with the extension-based functionality, instantiate, in accordance with the extension-based functionality, a user-defined function (UDF) for performing machine learning inference operations, call, with the UDF, the machine learning inference operation to process, at the database, the data retrieved from a table of the database, and transmit a response to the database query request, the response indicating an output of the machine learning inference operation, the output including a processed version of the data.

Another apparatus for data processing is described. The apparatus may include means for receiving, at a database that includes extension-based functionality, a database query request to perform a machine learning inference operation on data stored in the database, where the machine learning inference operation is to be performed at the database in accordance with the extension-based functionality, means for instantiating, in accordance with the extension-based functionality, a user-defined function (UDF) for performing machine learning inference operations, means for calling, with the UDF, the machine learning inference operation to process, at the database, the data retrieved from a table of the database, and means for transmitting a response to the database query request, the response indicating an output of the machine learning inference operation, the output including a processed version of the data.

A non-transitory computer-readable medium storing code for data processing is described. The code may include instructions executable by one or more processors to receive, at a database that includes extension-based functionality, a database query request to perform a machine learning inference operation on data stored in the database, where the machine learning inference operation is to be performed at the database in accordance with the extension-based functionality, instantiate, in accordance with the extension-based functionality, a user-defined function (UDF) for performing machine learning inference operations, call, with the UDF, the machine learning inference operation to process, at the database, the data retrieved from a table of the database, and transmit a response to the database query request, the response indicating an output of the machine learning inference operation, the output including a processed version of the data.

In some examples of the method, apparatus, and non-transitory computer-readable medium described herein, the data includes a set of multiple tuples stored at the database and the machine learning inference operation processes the data on a tuple-by-tuple basis.

In some examples of the method, apparatus, and non-transitory computer-readable medium described herein, processing the data on a tuple-by-tuple basis may include operations, features, means, or instructions for processing the set of multiple tuples based on a first parameter associated with a first tuple element included in each tuple of the set of multiple tuples and further based on a second parameter associated with a second tuple element included in each tuple of the set of multiple tuples.

Some examples of the method, apparatus, and non-transitory computer-readable medium described herein may further include operations, features, means, or instructions for inferring, with the machine learning inference operation, information that may be associated with one or more tuples of the set of multiple tuples and that may be not included in a tuple element of the one or more tuples of the set of multiple tuples and where the machine learning inference operation may be based on the information.

In some examples of the method, apparatus, and non-transitory computer-readable medium described herein, calling the machine learning inference operation may include operations, features, means, or instructions for providing a prompt that indicates the data to a processing model that performs the machine learning inference operation and receiving the response from the processing model, the response including the processed version of the data.

Some examples of the method, apparatus, and non-transitory computer-readable medium described herein may further include operations, features, means, or instructions for receiving an indication of one or more prompt parameters that may be included in the prompt.

In some examples of the method, apparatus, and non-transitory computer-readable medium described herein, the one or more prompt parameters include an instruction to provide a structured data output in response to a structured data input in the prompt.

In some examples of the method, apparatus, and non-transitory computer-readable medium described herein, the one or more prompt parameters include one or more indications of operations that may be performed in the machine learning inference operation.

In some examples of the method, apparatus, and non-transitory computer-readable medium described herein, the processing model may be a quantized local processing model.

In some examples of the method, apparatus, and non-transitory computer-readable medium described herein, the database may be a structured query language (SQL) database or a Postgres-based database.

In some examples of the method, apparatus, and non-transitory computer-readable medium described herein, the machine learning inference operation masks one or more elements of the data.

The following provides an overview of aspects of the present disclosure:

Aspect 1: A method for data processing, comprising: receiving, at a database that comprises extension-based functionality, a database query request to perform a machine learning inference operation on data stored in the database, wherein the machine learning inference operation is to be performed at the database in accordance with the extension-based functionality; instantiating, in accordance with the extension-based functionality, a user-defined function (UDF) for performing machine learning inference operations; calling, with the UDF, the machine learning inference operation to process, at the database, the data retrieved from a table of the database; and transmitting a response to the database query request, the response indicating an output of the machine learning inference operation, the output comprising a processed version of the data.

Aspect 2: The method of aspect 1, wherein the data comprises a plurality of tuples stored at the database; and the machine learning inference operation processes the data on a tuple-by-tuple basis.

Aspect 3: The method of aspect 2, wherein processing the data on a tuple-by-tuple basis comprises: processing the plurality of tuples based at least in part on a first parameter associated with a first tuple element included in each tuple of the plurality of tuples and further based at least in part on a second parameter associated with a second tuple element included in each tuple of the plurality of tuples.

Aspect 4: The method of any of aspects 2 through 3, further comprising: inferring, with the machine learning inference operation, information that is associated with one or more tuples of the plurality of tuples and that is not included in a tuple element of the one or more tuples of the plurality of tuples; wherein the machine learning inference operation is based at least in part on the information.

Aspect 5: The method of any of aspects 1 through 4, wherein calling the machine learning inference operation comprises: providing a prompt that indicates the data to a processing model that performs the machine learning inference operation; and receiving the response from the processing model, the response comprising the processed version of the data.

Aspect 6: The method of aspect 5, further comprising: receiving an indication of one or more prompt parameters that are to be included in the prompt.

Aspect 7: The method of aspect 6, wherein the one or more prompt parameters comprise an instruction to provide a structured data output in response to a structured data input in the prompt.

Aspect 8: The method of any of aspects 6 through 7, wherein the one or more prompt parameters comprise one or more indications of operations that are to be performed in the machine learning inference operation.

Aspect 9: The method of any of aspects 5 through 8, wherein the processing model is a quantized local processing model.

Aspect 10: The method of any of aspects 1 through 9, wherein the database is a structured query language (SQL) database or a Postgres-based database.

Aspect 11: The method of any of aspects 1 through 10, wherein the machine learning inference operation masks one or more elements of the data.

Aspect 12: An apparatus for data processing, comprising one or more memories storing processor-executable code, and one or more processors coupled with the one or more memories and individually or collectively operable to execute the code to cause the apparatus to perform a method of any of aspects 1 through 11.

Aspect 13: An apparatus for data processing, comprising at least one means for performing a method of any of aspects 1 through 11.

Aspect 14: A non-transitory computer-readable medium storing code for data processing, the code comprising instructions executable by one or more processors to perform a method of any of aspects 1 through 11.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers.

Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing at a database, comprising:

receiving, at the database that comprises extension-based functionality, a database query request to perform, at the database in accordance with the extension-based functionality, a machine learning inference operation on data stored in the database;

instantiating, in accordance with the extension-based functionality, a user-defined function (UDF) for performing machine learning inference operations;

streaming, by the UDF, a plurality of tuples from a table of the database based at least in part on the database query request;

inferring, with the machine learning inference operation, information that is associated with one or more tuples of the plurality of tuples and that is not included in a tuple element of the one or more tuples of the plurality of tuples;

calling, with the UDF, the machine learning inference operation to process, at the database and based at least in part on the information, each tuple of the plurality of tuples streamed from the table of the database, wherein calling the machine learning inference operation comprises:

providing a prompt that indicates the data to a processing model that performs the machine learning inference operation; and receiving a response from the processing model, the response indicating an output of the machine learning inference operation, the output comprising a plurality of processed tuples corresponding to the plurality of tuples; and transmitting the response to the database query request.

2. The method of claim 1, wherein:

the machine learning inference operation processes the plurality of tuples on a tuple-by-tuple basis.

3. The method of claim 2, wherein processing the data on the tuple-by-tuple basis comprises:

processing the plurality of tuples based at least in part on a first parameter associated with a first tuple element included in each tuple of the plurality of tuples and further based at least in part on a second parameter associated with a second tuple element included in each tuple of the plurality of tuples.

4. The method of claim 1, further comprising:

receiving an indication of one or more prompt parameters that are included in the prompt.

5. The method of claim 4, wherein the one or more prompt parameters comprise an instruction to provide a structured data output in response to a structured data input in the prompt.

6. The method of claim 4, wherein the one or more prompt parameters comprise one or more indications of operations that are performed in the machine learning inference operation.

7. The method of claim 1, wherein the processing model is a quantized local processing model.

8. The method of claim 1, wherein the database is a structured query language (SQL) database or a Postgres-based database.

9. The method of claim 1, wherein the machine learning inference operation masks one or more elements of the data.

10. An apparatus for data processing at a database, comprising:

one or more memories storing processor-executable code; and one or more processors coupled with the one or more memories and individually or collectively operable to execute the code to cause the apparatus to:

receive, at the database that comprises extension-based functionality, a database query request to perform, at the database in accordance with the extension-based functionality, a machine learning inference operation on data stored in the database;

instantiate, in accordance with the extension-based functionality, a user-defined function (UDF) for performing machine learning inference operations;

stream, by the UDF, a plurality of tuples from a table of the database based at least in part on the database query request;

infer, with the machine learning inference operation, information that is associated with one or more tuples of the plurality of tuples and that is not included in a tuple element of the one or more tuples of the plurality of tuples;

call, with the UDF, the machine learning inference operation to process, at the database and based at least in part on the information, each tuple of the plurality of tuples streamed from the table of the database, wherein, to call the machine learning inference operation, the one or more processors are individually or collectively operable to execute the code to cause the apparatus to:

provide a prompt that indicates the data to a processing model that performs the machine learning inference operation; and receive a response from the processing model, the response indicating an output of the machine learning inference operation, the output comprising a plurality of processed tuples corresponding to the plurality of tuples; and transmit the response to the database query request.

11. The apparatus of claim 10, wherein:

the machine learning inference operation processes the plurality of tuples on a tuple-by-tuple basis.

12. The apparatus of claim 11, wherein, to process the data on the tuple-by-tuple basis, the one or more processors are individually or collectively operable to execute the code to cause the apparatus to:

process the plurality of tuples based at least in part on a first parameter associated with a first tuple element included in each tuple of the plurality of tuples and further based at least in part on a second parameter associated with a second tuple element included in each tuple of the plurality of tuples.

13. The apparatus of claim 9, wherein the one or more processors are individually or collectively further operable to execute the code to cause the apparatus to:

receive an indication of one or more prompt parameters that are included in the prompt.

14. The apparatus of claim 13, wherein the one or more prompt parameters comprise an instruction to provide a structured data output in response to a structured data input in the prompt.

15. The apparatus of claim 13, wherein the one or more prompt parameters comprise one or more indications of operations that are performed in the machine learning inference operation.

16. A non-transitory computer-readable medium storing code for data processing at a database, the code comprising instructions executable by one or more processors to:

receive, at the database that comprises extension-based functionality, a database query request to perform, at the database in accordance with the extension-based functionality, a machine learning inference operation on data stored in the database;

instantiate, in accordance with the extension-based functionality, a user-defined function (UDF) for performing machine learning inference operations;

stream, by the UDF, a plurality of tuples from a table of the database based at least in part on the database query request;

infer, with the machine learning inference operation, information that is associated with one or more tuples of the plurality of tuples and that is not included in a tuple element of the one or more tuples of the plurality of tuples;

call, with the UDF, the machine learning inference operation to process, at the database and based at least in part on the information, each tuple of the plurality of tuples streamed from the table of the database, wherein, to call the machine learning inference operation, the instructions are executable by the one or more processors to:

provide a prompt that indicates the data to a processing model that performs the machine learning inference operation; and receive a response from the processing model, the response indicating an output of the machine learning inference operation, the output comprising a plurality of processed tuples corresponding to the plurality of tuples; and transmit the response to the database query request.

* * * * *